(12) United States Patent
Lai et al.

(10) Patent No.: US 11,070,815 B2
(45) Date of Patent: Jul. 20, 2021

(54) METHOD AND APPARATUS OF INTRA-INTER PREDICTION MODE FOR VIDEO CODING

(71) Applicant: MEDIATEK INC., Hsinchu (TW)

(72) Inventors: Chen-Yen Lai, Hsinchu (TW); Ching-Yeh Chen, Hsinchu (TW); Chih-Wei Hsu, Hsinchu (TW); Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/619,244

(22) PCT Filed: Jun. 7, 2018

(86) PCT No.: PCT/CN2018/090253
§ 371 (c)(1),
(2) Date: Dec. 4, 2019

(87) PCT Pub. No.: WO2018/224004
PCT Pub. Date: Dec. 13, 2018

(65) Prior Publication Data
US 2020/0204824 A1 Jun. 25, 2020

Related U.S. Application Data

(60) Provisional application No. 62/516,157, filed on Jun. 7, 2017.

(51) Int. Cl.
*H04N 19/159* (2014.01)
*H04N 19/126* (2014.01)
(Continued)

(52) U.S. Cl.
CPC ......... *H04N 19/159* (2014.11); *H04N 19/126* (2014.11); *H04N 19/176* (2014.11);
(Continued)

(58) Field of Classification Search
CPC ...... H04N 19/50; H04N 19/61; H04N 19/103; H04N 19/503; H04N 19/593
See application file for complete search history.

(56) References Cited

U.S. PATENT DOCUMENTS 9,374,578 B1 6/2016 Mukherjee et al.
9,485,513 B2 11/2016 Ichigaya et al.
(Continued)

FOREIGN PATENT DOCUMENTS

CN 1984340 A 6/2007
WO 2014/039802 A2 3/2014
(Continued)

OTHER PUBLICATIONS

International Search Report dated Aug. 10, 2018, issued in application No. PCT/CN2018/090253.
(Continued)

*Primary Examiner* — David N Werner
(74) *Attorney, Agent, or Firm* — Oblon, McClelland, Maier & Neustadt, L.L.P.

(57) ABSTRACT

Method and apparatus of video coding are disclosed. According to the method, a boundary region in the current block is determined. For each pixel in the boundary region, an Intra predictor and an Inter predictor care derived. An Intra-Inter predictor is generated by blending the Intra predictor and the Inter predictor. Pixels in the boundary region of the current block are encoded or decoded using the Intra-Inter predictor. For the remaining pixels in the current block not belonging to the boundary region, the pixels are encoded or decoded using the Inter predictor or the Intra predictor. In another method, the Intra-Inter prediction process is implemented by scaling the sum of the Intra weighting factor and the Inter weighting factor is scaled to a power-of-2 number to avoid the need for the division (Continued)

operation. In yet another method, the Intra-Inter prediction is applied depending on the current block size.

6 Claims, 10 Drawing Sheets

(51) Int. Cl.
  *H04N 19/176* (2014.01)
  *H04N 19/55* (2014.01)
  *H04N 19/593* (2014.01)
  *H04N 19/503* (2014.01)
  H04N 19/182 (2014.01)
  H04N 19/573 (2014.01)
(52) U.S. Cl.
  CPC ........... *H04N 19/503* (2014.11); *H04N 19/55* (2014.11); *H04N 19/593* (2014.11); *H04N 19/182* (2014.11); *H04N 19/573* (2014.11)

(56) References Cited

U.S. PATENT DOCUMENTS

| | | | |
|---|---|---|---|
| 9,609,343 B1 | 3/2017 | Chen et al. | |
| 10,666,940 B2 | 5/2020 | Park et al. | |
| 2007/0098067 A1 | 5/2007 | Kim et al. | |
| 2012/0263229 A1* | 10/2012 | Lim | H04N 19/503 375/240.02 |
| 2013/0322530 A1* | 12/2013 | Rossato | H04N 19/59 375/240.12 |
| 2014/0072041 A1* | 3/2014 | Seregin | H04N 19/176 375/240.13 |
| 2014/0355677 A1* | 12/2014 | Kondo | H04N 19/132 375/240.12 |
| 2015/0195566 A1* | 7/2015 | Hinz | H04N 19/117 375/240.13 |
| 2016/0057420 A1* | 2/2016 | Pang | H04N 19/593 375/240.16 |
| 2016/0337662 A1* | 11/2016 | Pang | H04N 19/176 |
| 2017/0006294 A1 | 1/2017 | Huang et al. | |
| 2018/0249156 A1 | 8/2018 | Heo et al. | |
| 2018/0376149 A1* | 12/2018 | Zhang | H04N 19/503 |
| 2019/0068977 A1* | 2/2019 | Zhang | H04N 19/186 |
| 2019/0215521 A1* | 7/2019 | Chuang | H04N 19/105 |
| 2020/0120334 A1* | 4/2020 | Xu | H04N 19/573 |
| 2020/0162737 A1* | 5/2020 | Van der Auwera | H04N 19/109 |
| 2020/0252640 A1* | 8/2020 | Zhao | H04N 19/593 |
| 2020/0275115 A1* | 8/2020 | Chiang | H04N 19/107 |
| 2021/0006784 A1* | 1/2021 | Lim | H04N 19/117 |

FOREIGN PATENT DOCUMENTS

| | | |
|---|---|---|
| WO | 2016/072775 A1 | 5/2016 |
| WO | 2017/043816 A1 | 3/2017 |
| WO | WO-2020187329 A1 * | 9/2020 ........... H04N 19/176 |

OTHER PUBLICATIONS

European Search Report dated Oct. 20, 2020, issued in application No. EP 18813586.7.
Xin, J., et al.; "Combined Inter-Intra Prediction for High Definition Video Coding;" Nov. 2007, pp. 1-4.

* cited by examiner

METHOD AND APPARATUS OF INTRA-INTER PREDICTION MODE FOR VIDEO CODING

CROSS REFERENCE TO RELATED APPLICATIONS

The present invention claims priority to U.S. Provisional Patent Application, Ser. No. 62/516,157, filed on Jun. 7, 2017. The U.S. Provisional Patent Application is hereby incorporated by reference in its entirety.

TECHNICAL FIELD

The present invention relates to video coding Inter prediction. In particular, the present invention relates to a new Inter by blending the Intra and Inter prediction.

BACKGROUND

Video data requires a lot of storage space to store or a wide bandwidth to transmit. Along with the growing high resolution and higher frame rates, the storage or transmission bandwidth requirements would be formidable if the video data is stored or transmitted in an uncompressed form. Therefore, video data is often stored or transmitted in a compressed format using video coding techniques. The coding efficiency has been substantially improved using newer video compression formats such as H.264/AVC and the HEVC (High Efficiency Video Coding) standards. In order to maintain manageable complexity, an image is often divided into blocks, such as macroblock (MB) or LCU/CU to apply video coding. Video coding standards usually adopt adaptive Inter/Intra prediction on a block basis.

FIG. 1 illustrates an exemplary adaptive Inter/Intra video coding system incorporating loop processing. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion, coding modes, and other information associated with the image area. The side information, such as Intra prediction data, motion information and loop filter information, may also be compressed by entropy coding to reduce required bandwidth. Accordingly, the data associated with the side information are provided to Entropy Encoder 122 as shown in FIG. 1. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1, incoming video data undergoes a series of processing in the encoding system. The reconstructed video data from REC 128 may be subject to various impairments due to a series of processing. Accordingly, Loop filter 130 is often applied to the reconstructed video data before the reconstructed video data are stored in the Reference Picture Buffer 134 in order to improve video quality. For example, deblocking filter (DF) and Sample Adaptive Offset (SAO) have been used in the High Efficiency Video Coding (HEVC) standard. The filter information may have to be incorporated in the bitstream so that a decoder can properly recover the required information. Therefore, loop filter information is provided to Entropy Encoder 122 for incorporation into the bitstream. In FIG. 1, Loop filter 130 is applied to the reconstructed video before the reconstructed samples are stored in the reference picture buffer 134. The system in FIG. 1 is intended to illustrate an exemplary structure of a typical video encoder.

In Intra prediction, the current block is predicted by previously decoded boundary samples from spatially neighbouring blocks. For HEVC, there are 33 different angular modes, DC mode, and planar modes for block sizes from 4×4 up to 32×32. A next generation video coding is being developed to further improve the coding efficiency, which discloses improved Intra prediction. For example, in JEM-6 (Chen et al., "Algorithm Description of Joint Exploration Test Model 6 (JEM6)", Joint Video Exploration Team (WET) of ITU-T SG 16 WP 3 and ISO/IEC JTC 1/SC 29/WG 11, 6th Meeting: Hobart, AU, 31 Mar.-7 Apr. 2017, Document: JVET-F1001), finer granularity arbitrary directional Intra prediction is disclosed, where 67 Intra prediction modes are used including planar mode, DC mode, and 65 angular modes. The coding unit supported by the next generation video coding is enlarged to 265×256.

In Inter prediction, each block will try to find a similar block in one or more previously coded frames, referred to as reference frames, the motion information will be signalled or derived. In HEVC, the motion information typically consists of the horizontal and vertical motion vector displacement values, one or two reference picture indices and in the case of prediction regions in B slices, and identification of which reference picture list is associated with each index.

In HEVC, the Inter prediction also includes a merge mode to inherit the motion information from spatially or temporally neighbouring blocks. A merge candidate list is maintained at both the encoder end and the decoder end. The selected candidate from the list can be indicated by a merge index without the need to signal the motion information. It is named as the merge mode since it forms a merged region for sharing all motion information. The merge mode is similar to the direct and skip modes in AVC.

In the next generation video coding, various Inter prediction techniques have been disclosed to improve the performance of coding efficiency. For example, in VCEG-AZO7 (Chen et al., "Further improvements to HMKTA-1.0", Video Coding Experts Group (VCEG) of ITU-T SG16 Q, 2015), a pattern-based MV derivation (PMVD) method is disclosed. The pattern-based MV derivation (PMVD) method is also referred as FRUC (Frame Rate Up Conversion) in VCEG-AZ07. The FRUC consists of bilateral matching for a bi-prediction block and temporal matching for a uni-prediction block. The predictor derived according to the PMVD (a.k.a. FRUC) can be inserted into the merge list as another candidate.

FIG. 2 illustrates an example of FRUC (Frame Rate Up Conversion) bilateral matching mode, where the motion information for a current block 210 is derived based on two reference pictures. The motion information of the current block is derived by finding the best match between two blocks (220 and 230) along the motion trajectory 240 of the current block in two different reference pictures (i.e., Ref0 and Ref1). Under the assumption of continuous motion trajectory, the motion vectors MV0 associated with Ref0 and MV1 associated with Ref1 pointing to the two reference blocks shall be proportional to the temporal distances, i.e., TD0 and TD1, between the current picture (i.e., Cur pic) and the two reference pictures Ref0 and Ref1.

FIG. 3 illustrates an example of template matching FRUC mode. The neighbouring areas (320a and 320b) of the current block 310 in a current picture (i.e., Cur pic) are used as a template to match with a corresponding template (330a and 330b) in a reference picture (i.e., Ref0 in FIG. 3). The best match between template 320a/320b and template 330a/330b will determine a decoder derived motion vector 340. While Ref0 is shown in FIG. 3, Ref1 can also be used as a reference picture.

In HEVC, only translation motion model is applied for motion compensation prediction (MCP). While in the real world, there're many kinds of motions, e.g. zoom in/out, rotation, perspective motions and the other irregular motions. The affine model is capable of describing two-dimensional block rotations as well as two-dimensional deformations to transform a square (or rectangles) into a parallelogram. This model can be described as follows:

$$x' = ax + by + e,$$

$$y' = cx + dy + f. \quad (1)$$

In this model, a total of six parameters (i.e., a, b, c, d, e and f) are used. For each pixels $A(x, y)$ in the area of Interest, the motion vector between this pixel and its corresponding reference pixel $A'(x', y)$ can be derived using motion vector field (MVF) of a block.

In the next generation video coding, a simplified affine transform motion compensation prediction is applied in order to improve the coding efficiency. The affine motion field of the block is described by motion vectors associated with two control points and the affine model only uses four parameters instead of six.

Beside the PMVD and affine motion model, other improved Inter prediction techniques, such as spatial-temporal motion vector prediction (STMVP) and various sub-PU based motion vector prediction, are also proposed to the next generation video coding.

In the present invention, a new Inter prediction mode is disclosed, which combines the Intra prediction mode with the Inter prediction mode.

SUMMARY

Method and apparatus of video coding performed by a video encoder or a video decoder are disclosed. According to the method, a boundary region in the current block is determined. For each pixel in the boundary region, an Intra predictor is derived from Intra reference pixels; an Inter predictor comprising Inter reference pixels located in a reference block in a reference picture is also derived; an Intra-Inter predictor is generated by blending the Intra predictor and the Inter predictor; and the boundary region pixel is encoded or decoded using the Intra-Inter predictor. The reference block is coded prior to the current block. The Intra reference pixels are in the current picture located above a top boundary of the current block or on a left side of a left boundary of the current block. The Intra reference pixels are coded prior to the current block. For the remaining pixels in the current block not belonging to the boundary region, the remaining pixels are encoded or decoded using the Inter predictor or the Intra predictor.

In one embodiment, the boundary region corresponds to first N rows of the current block close to the Intra reference pixels, first N columns of the current block close to the Intra reference pixels, or both, wherein N is an integer greater than 0. N can be pre-defined or signalled based on the current block size. A location associated with a largest gradient at a first row or a first column of the current block can be derived based on samples of the Intra predictor, the Inter predictor or differences between the Intra predictor and the Inter predictor, and the location is used to determine a value of N. Alternatively, a location associated with a largest gradient at a first row or a first column of the current block can be derived based on samples of the Intra predictor, the Inter predictor or differences between the Intra predictor and the Inter predictor, and if the largest gradient is substantially larger than an average gradient of vertical gradients and horizontal gradients calculated for the first row or the first column of the current block, the location is used to determine a value of N and otherwise, a default value is used for N. When the largest gradient is larger than an average gradient by a certain quantity or percentage, it may be considered "substantially". For example, when the largest gradient is 50% larger than an average gradient, it is considered "substantial". In another case, a location associated with a largest difference between the Intra predictor and neighbouring reconstructed pixels, between the Inter predictor and neighbouring reconstructed pixels, or between the Inter predictor and the Intra predictor can be derived or between the Inter predictor and the Intra predictor, and the location is used to determine a value of N. The remaining pixels in the current block not belonging to the boundary region are encoded or decoded using the Inter predictor.

In one embodiment, said determining the boundary region in the current block comprises detecting pattern edges in the current block based on the Inter predictor, the Intra predictor or differences between the Intra predictor and the Inter predictor, and the boundary region is determined according to the pattern edges. Said detecting the pattern edges may comprise calculating a largest gradient based on the Inter predictor, the Intra predictor or the difference between the Intra predictor and the Inter predictor depending on whether an Intra prediction mode associated with the Intra predictor is closer to a vertical direction or a horizontal direction. The boundary region may comprise one edge pixel in each column or each row. The boundary region may further comprise any neighbouring pixel adjacent to one edge pixel in a same column or a same row of the current block. The boundary region may further comprise any additional pixel located in a current column or row between a current edge pixel in the current column or row and a previous edge pixel in a previous column or row. For a target pixel in the current block not belonging to the boundary region, the target pixel can be encoded or decoded using the Intra predictor if the target pixel is above or on a left side of one edge pixel in a same column or a same row as the target pixel. For a target pixel in the current block not belonging to the boundary region, the target pixel can be encoded or decoded using the Inter predictor if the target pixel is below or on a right side of one edge pixel in a same column or a same row as the target pixel.

Another method and apparatus of video coding performed by a video encoder or a video decoder are also disclosed. After an Intra predictor and an Inter predictor are derived, a weighted sum of the Intra predictor and the Inter predictor is generated, where said generating the weighted sum of the Intra predictor and the Inter predictor comprises adding weighted Intra predictor and weighted Inter predictor, the weighted Intra predictor is derived by multiplying the Intra predictor with an Intra weighting factor and the weighted Inter predictor is derived by multiplying the Inter predictor with an Inter weighting factor, and the sum of the Intra weighting factor and the Inter weighting factor is scaled to a power-of-2 number. A normalized Intra-Inter predictor is generated by applying a right-shift operation to the weighted sum of the Intra predictor and the Inter predictor. The current block is then encoded or decoded using the normalized Intra-Inter predictor. A bias can be added to the sum of the weighted Intra predictor and the weighted Inter predictor.

Yet another method and apparatus of video coding performed by a video encoder or a video decoder are also disclosed. According to this method, an Intra-Inter prediction mode for the current block is disabled if the size of the current block is greater than a maximum block size or smaller than a minimum block size.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

In a conventional coding system, a block is either coded in the Intra prediction mode or the Inter prediction mode. In the present invention, a combined Intra prediction and Inter prediction mode is disclosed for Inter pictures in video compression. In this invention, signalling of the Intra-Inter mode is also disclosed. The Intra-Inter mode can be applied to sub block partition (e. g. prediction unit (PU) and transform unit (TU)). The sub block (i.e., CU, PU and TU) level signalling associated with the proposed Intra-Inter prediction mode is also disclosed. Furthermore, various aspects related to the new Intra-Inter prediction mode, such as adjusting the number of Intra modes for the Intra-Inter mode, modifying the weighting coefficients for Intra predictor and Inter predictor, and controlling the parameters or on/off of Intra-Inter mode at High Level Syntax are disclosed.

Intra-Inter Mode.

Figure 1:
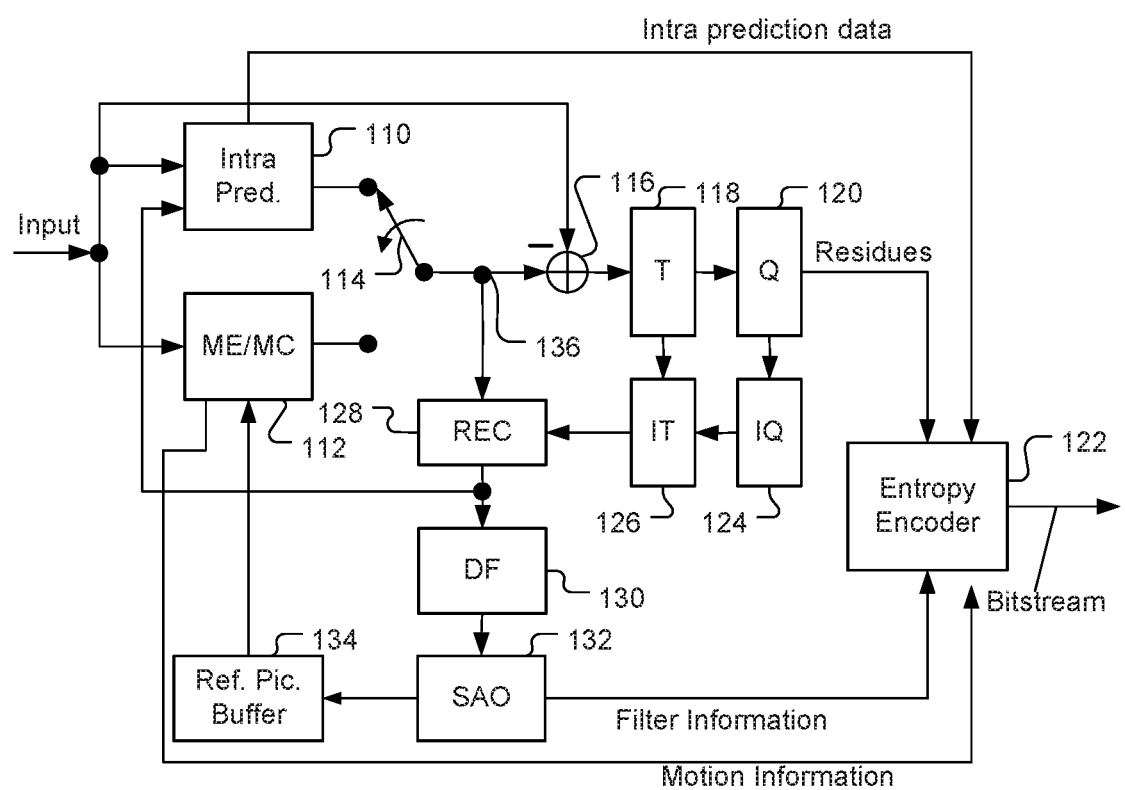
FIG. 1 illustrates an exemplary adaptive Inter/Intra video coding system incorporating loop processing.
Figure 2:
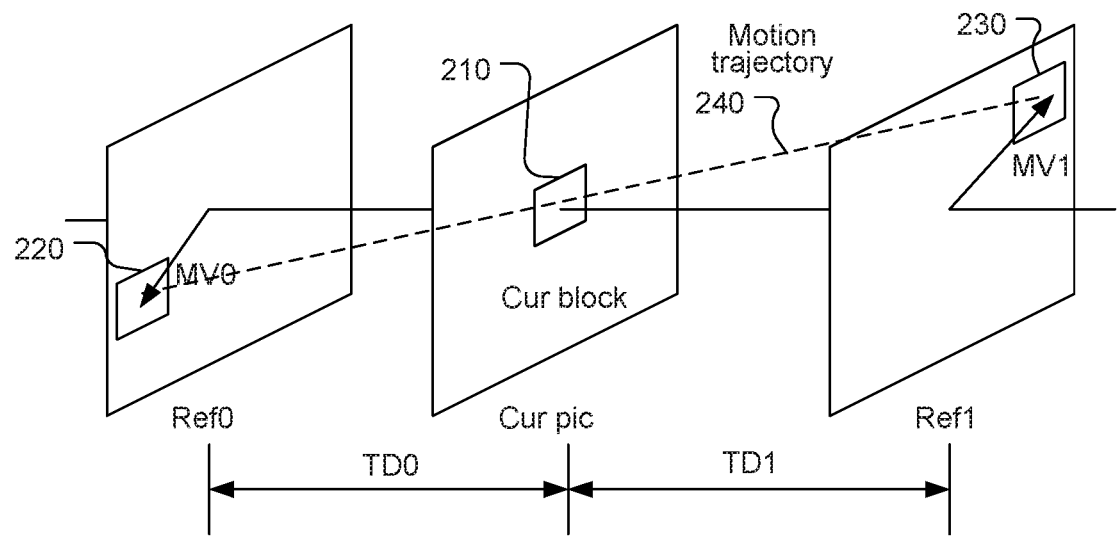
FIG. 2 illustrates an example of FRUC (Frame Rate Up Conversion) bilateral matching mode, where the motion information for a current block is derived based on two reference pictures.
Figure 3:
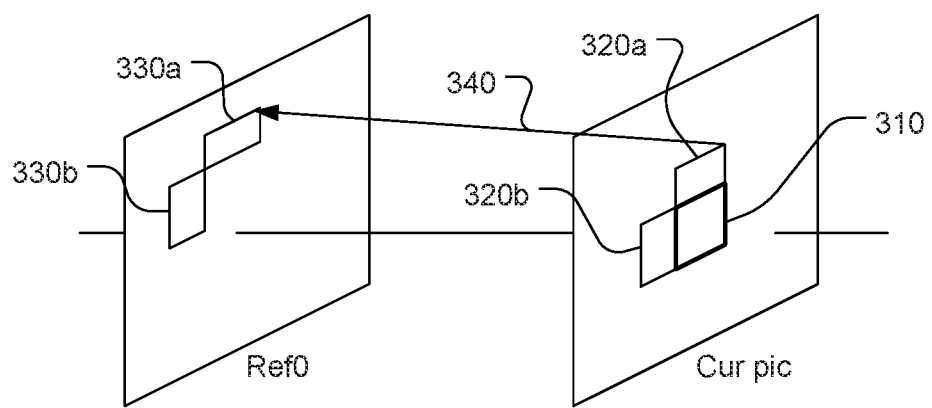
FIG. 3 illustrates an example of template matching FRUC mode. The neighbouring areas of the current block in a current picture are used as a template to match with a corresponding template in a reference picture.
Figure 4:
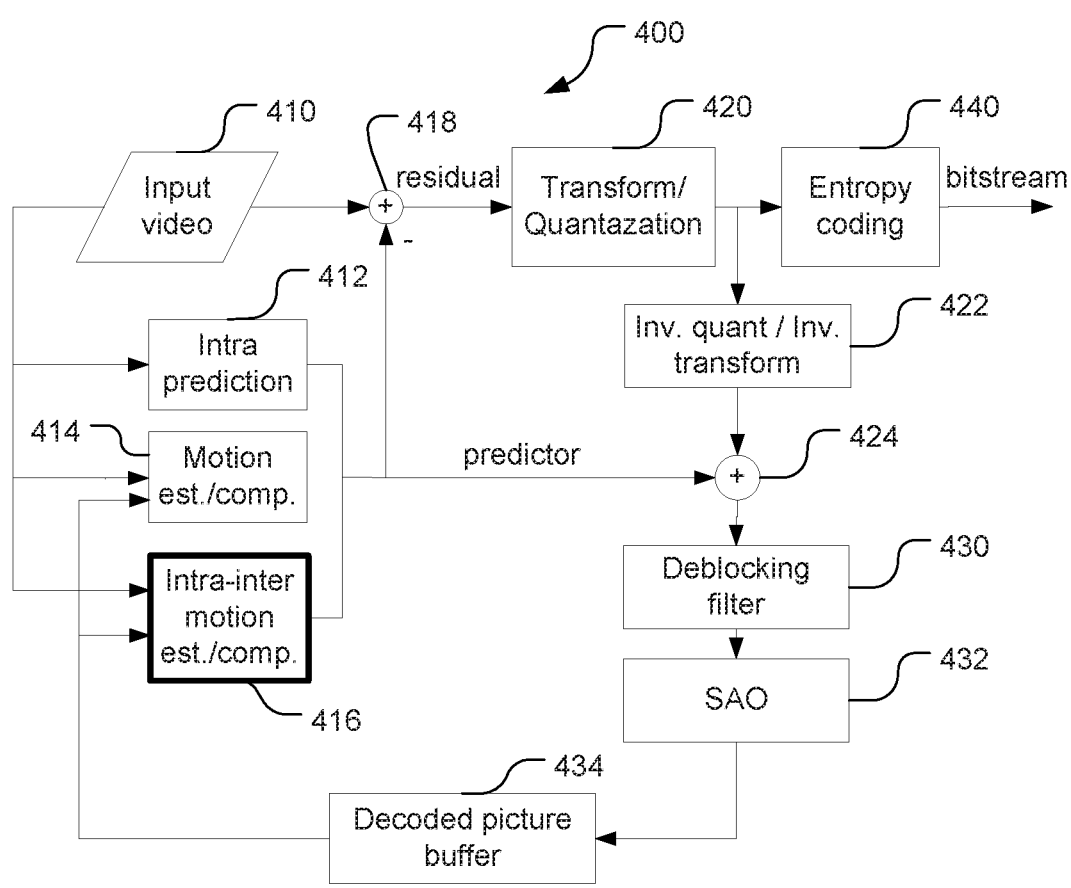
FIG. 4 illustrates an exemplary encoder block diagram according to an embodiment of the present invention, where the encoder chooses among Intra mode, Inter mode and Intra-Inter mode to encode input video.

The Intra-Inter mode is a new mode that combines the Intra mode and the Inter mode to form the new Inter prediction. In one exemplary encoder block diagram as shown in FIG. 4, the encoder 400 chooses among Intra mode, Inter mode and Intra-Inter mode to encode input video 410. When the Intra mode is selected, Intra prediction 412 is used to generate the predictor. When the regular Inter mode is used, motion estimation/compensation 414 is applied to the current block. When the Intra-Inter mode is used, motion estimation/compensation as well as Intra prediction 416 is applied to the current block. The predictor (i.e., Intra, Inter or Intra-Inter predictor) is subtracted from the current block using an adder 418 to form the residual. The residual is then processed by transform and quantization 420 to form quantized transform coefficients, which is further processed by entropy coding block 440 to generate bitstream. At the encoder side, the reconstructed pictures have to be generated and stored as reference pictures for Inter prediction. Accordingly, the encoder also includes inverse quantization and inverse transform 422 to form reconstructed residual, which is added to the predictor using adder 424 to form reconstructed signal. In order to reduce coding artefacts, filters such as deblocking filter 430 and sample adaptive offset (SAO) 432 are applied to the reconstructed pictures. Decoded picture buffer 434 is used to store the filtered-reconstructed pictures as reference pictures. In the encoder side, it will be signalled to indicate whether the current block is coded as Intra mode, Inter mode or Intra-Inter mode. At the decoder side, it will derive or parse the coding mode for the current block. When the current block uses Intra-Inter mode, the Intra coding information (e.g. Intra modes) and Inter coding information (e.g. the reference picture index, motion vector, bi-prediction or uni-prediction) will be signalled at the encoder side or derived at the decoder side.

In another embodiment, the Intra-Inter mode can be treated as a special Inter mode under the Inter prediction branch. When the current block is coded as an Inter prediction mode, a flag will be signalled at the encoder side or derived at the decoder side to indicate whether the current prediction block is the normal Inter mode or the Intra-Inter mode. When the current block uses Intra-Inter mode, the Intra coding information (e.g. Intra modes) and Inter coding information (the reference list index, motion vector, bi-prediction or uni-prediction) will be signalled at the encoder side or derived at the decoder side.

In another embodiment, the Intra-Inter mode can be treated as a special Intra mode under the Intra prediction branch. When the current block is coded as an Intra prediction mode, a flag will be signalled at the encoder side or derived at the decoder side to indicate whether the current block is coded as the normal Intra mode or the Intra-Inter mode. When the current block uses Intra-Inter mode, the Intra coding information (e.g. Intra modes) and Inter coding information (the reference list index, motion vector, bi-prediction or uni-prediction) will be signalled at the encoder side or derived at the decoder side.

Intra-Inter Mode Predictor Generation.

Figure 5:
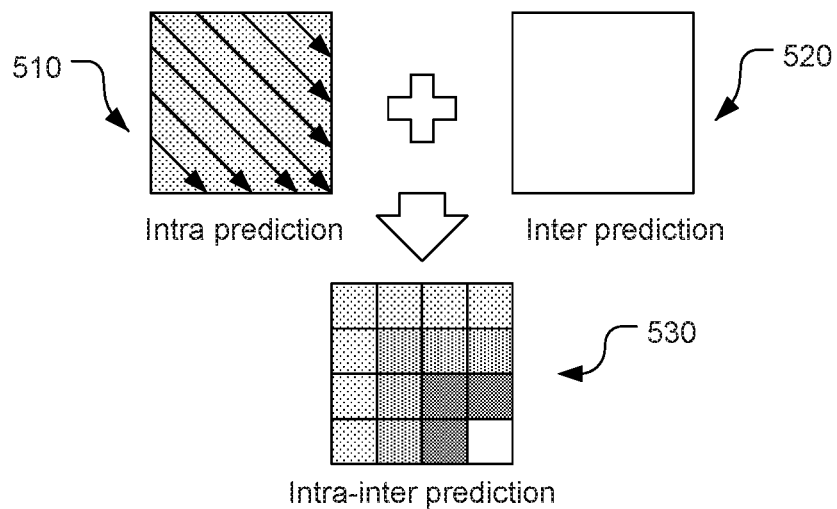
FIG. 5 illustrates an example of generating Intra-Inter predictor by combining the Intra predictor and Inter predictor with weighting coefficients.

In the proposed method, for each block, there will be an Intra predictor, and an Inter predictor. Intra predictor will be combined with Inter predictor with weighting coefficients to generate a new predictor as shown in FIG. 5. In FIG. 5, the Intra predictor 510 is combined with the Inter predictor 520 to form a combined Intra-Inter predictor 530.

In this invention, Intra prediction means a predictor derived from neighbouring boundaries of a current block in the same picture. There can be many variants regarding how the neighbouring pixels are used to predict the current block. In one embodiment, the current picture can use the traditional HEVC Intra mode. In another embodiment, the current picture can use the more advanced Intra prediction as disclosed in JEM as disclosed in JVET-F1001. In another embodiment, the current picture can use fewer directions in the angular Intra mode. In another embodiment, the current block can derive Intra predictor based on filtered or unfiltered the samples of neighbouring block, and the Intra predictor can be further refined by filtering of the sample of current block.

In this invention, Inter prediction means the predictor is from previous frames, it can be normal Inter mode, merge mode, FRUC mode, affine mode, or other predictors from previous frame.

Signalling of the Intra-Inter mode.

In this section, the signalling of Intra Inter mode is disclosed.

In one example, the Intra-Inter mode is treated as an Inter prediction mode. In this case, when the current block is coded in Inter prediction, a flag is used to indicate whether it is coded in Intra-Inter prediction or not. If it is the Intra-Inter mode, the Intra information will be signalled; and the Inter information (i.e., motion information) is also signalled at the encoder side or derived at the decoder side. Otherwise, only the Inter information is signalled or derived. An exemplary syntax design is provided based on the HEVC syntax in Table 1.

TABLE 1

An example of syntax for Intra-Inter mode at PU level

| | Descriptor | Note |
|---|---|---|
| prediction_unit( x0, y0, nPbW, nPbH ) { | | |
|   if( skip_flag[ x0 ][ y0 ] ) { | | |
|     if( MaxNumMergeCand > 1 ) | | |

TABLE 1-continued

An example of syntax for Intra-Inter mode at PU level

| | Descriptor | Note |
|---|---|---|
|       {merge_idx[ x0 ][ y0 ] | ae(v) | |
|       intra_inter_mode_flag | ae(v) | (1-1a) |
|       if( intra_inter_mode_flag) | | (1-2a) |
|         intra_pred_mode } | ae(v) | (1-3a) |
|   } else { /* MODE_INTER */ | | |
|     merge_flag[ x0 ][ y0 ] | ae(v) | |
|     if( merge_flag[ x0 ][ y0 ] ) { | | |
|       if( MaxNumMergeCand > 1 ) | | |
|         {merge_idx[ x0 ][ y0 ] | ae(v) | |
|         intra_inter_mode_flag | ae(v) | (1-1b) |
|         if( intra_inter_mode_flag) | | (1-2b) |
|           intra_pred_mode } | ae(v) | (1-3b) |
|     } else { | | |
|       if( slice_type = = B ) | | |
|       ... | | |
|       if( inter_pred_idc[ x0 ][ y0 ] ! = Pred_L0 ) { | | |
|       ... | | |
|       } | | |
|       intra_inter_mode_flag | ae(v) | (1-1c) |
|       if( intra_inter_mode _flag) | | (1-2c) |
|         intra_pred_mode | ae(v) | (1-3c) |
|     } | | |
|   } | | |
| } | | |

In Table 1, for the skip mode, a flag (i.e., intra_inter_mode_flag) is used (as shown in note (1-1a)) to indicate whether the Intra-Inter mode is used for the current PU. The value of intra_inter_mode_flag is checked to determine whether the value is set to 1 (i.e., "if (intra_inter_mode_flag)", as shown in note (1-2a)). If the value is set to 1, syntax element intra_pred_mode as shown in note (1-3a) is used to indicate the Intra prediction information. Similar statements are included in the syntax table for the merge mode (as indicated by notes (1-1c), (1-2c) and (1-3c)) and the bi-prediction mode and uni-prediction mode (as indicated by notes (1-1b), (1-2b). In the above example, intra_inter_mode_flag can be context coded or bypass coded. It can use one context, two contexts, or three contexts.

In the case of using two contexts for coding the Intra-Inter flag, if any of the above and left blocks uses the Intra-Inter mode, context 0 is selected; otherwise context 1 is selected. In the case of using three contexts for coding the Intra-Inter flag, if none of the above block and left blocks uses the Intra-Inter mode, context 0 is selected; if one of the above block and left blocks uses the Intra-Inter mode, context 1 is selected; and if the above and left blocks both use the Intra-Inter mode, context 2 is selected.

The Weighting Coefficients for the Intra-Inter Mode.

When combining the Intra mode and the Inter mode, different weights can be applied to the Intra predictor and the Inter predictor. Let w_Intra and w_Inter denote the weighting coefficients for the Intra mode and Inter mode. The Intra-Inter predictor can be derived according to:

$$Pred=w\_Intra*Pred\_Intra+w\_Inter*Pred\_Inter \qquad (2)$$

In the above equation, Pred is the combined predictor, Pred_Intra is the Intra predictor, Pred_Inter is the Inter predictor, and w_Intra+w_Inter=1.

In one embodiment, the weighting coefficient is related to the Intra mode direction. For example, w_Intra may decrease along the Intra mode direction. On the other hand, w_Inter may increase along the Intra mode direction.

Figure 6:
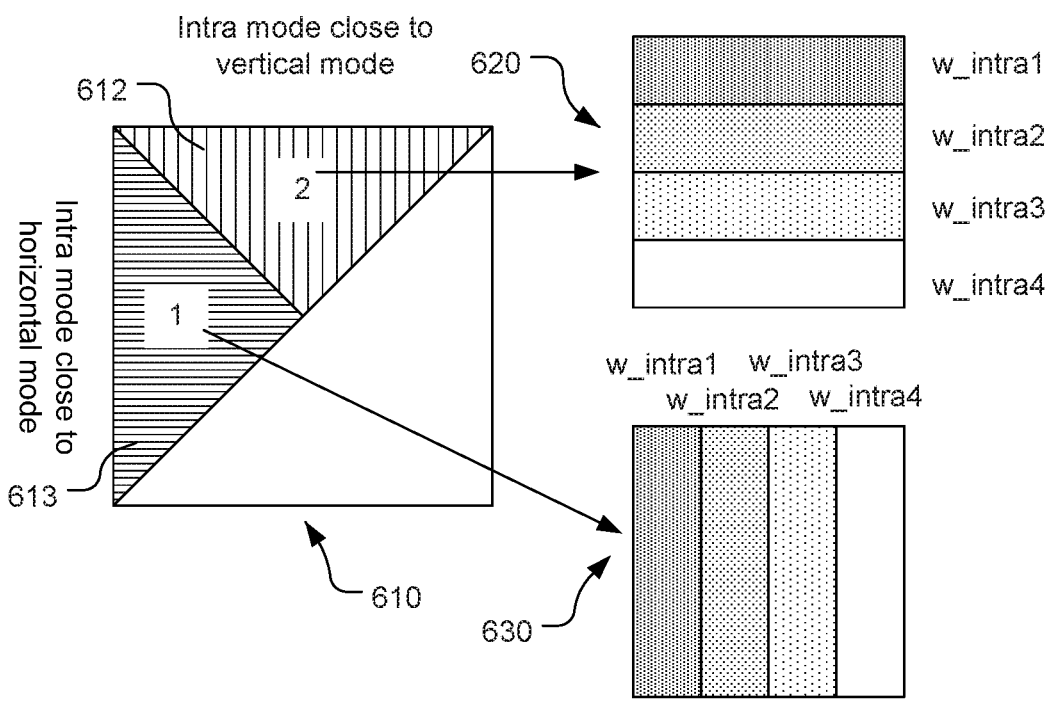
FIG. 6 illustrates an example of weighting coefficient selection according to the angular mode, where all the angular modes are divided into two groups and each group uses a corresponding weighting block with four coefficient bands.

In one example, if the samples are mostly predicted by the above reference pixels (i.e., Intra prediction direction close to the vertical mode), the weight of the Intra predictor (i.e., w_Intra) is decreasing row(s) by row(s) or row-wise in a downward direction. If the samples are mostly predicted by the left reference pixels (i.e., Intra prediction direction close to the horizontal mode), the weight of the Intra predictor (i.e., w_Intra) is decreasing column(s) by column(s) or column-wise toward the right direction. If the Intra mode is DC mode or planar mode, w_Intra is set to 0.5, and w_Inter is also set to 0.5 for the whole blocks. In another example, w_Intra and w_Inter can be other numbers. For example, the sum of w_Intra and w_Inter may have a value other than 1. However, (w_Intra+w_Inter) is still equal to 1 if the Intra mode is DC mode or planar mode. FIG. 6 illustrates an example of weighting coefficient selection according to the angular mode.

In FIG. 6, all the angular modes 610 are divided into two groups, where all angular Intra modes with a prediction direction closer to the vertical mode are classified as the vertical group 612 and all angular Intra modes with a prediction direction closer to the horizontal mode are classified as the horizontal group 613. If a block is Intra coded by an Intra mode belonging to the vertical group, the set of Intra weights 620 is used, where the Intra weights are divided into four bands row-wise (i.e., w_Intra1 to w_Intra4) with decreasing weights from w_Intra1 to w_Intra4. If a block is Intra coded by an Intra mode belonging to the horizontal group, the set of Intra weights 630 is used, where the Intra weights are divided into four bands column-wise (i.e., w_Intra1 to w_Intra4) with decreasing weights from w_Intra1 to w_Intra4.

In the above example, for the four Intra predictor weighting coefficients (i.e., w_Intra1, w_Intra2, w_Intra_3, and w_Intra4), the Inter predictor weighting coefficients (i.e., w_Inter1, w_Inter2, w_Inter_3, and w_Inter4) can be derived according to: w_Inter1=1−w_Intra1, w_Inter2=1−w_Intra2, w_Inter3=1−w_Intra3, and w_Inter4=1−w_Intra4. In this example, there are 4 weighting coefficients for the 4 sample bands of the Intra weights, which are decreasing from the boundary near the reference pixels toward the boundary far from the reference pixels. In another embodiment, there can be N weighting coefficients for each block, where N is an integer greater than 1. In another embodiment, for a larger block size, a larger number of weighting coefficients may be used (i.e. more weighting coefficients can be selected for deriving the Intra-Inter predictors), and for the smaller block size, a smaller number of weighting coefficients may be used (i.e. less weighting coefficients can be selected for deriving the Intra-Inter predictors). In another embodiment, for each group, the region with the same coefficients can be non-linear, which means the widths of each region are not necessarily the same.

In another example, the Intra modes are grouped by their prediction directions. For example, the Intra modes can be divided into 5 groups corresponding to the vertical (denoted as group A), horizontal (denoted as group B), diagonal (denoted as group C), vertical-diagonal (denoted as group D), and mode-2 (denoted as group E) groups in FIG. 7. As is known for Intra prediction in HEVC or the next generation video coding, mode-2 corresponds to the upper-right diagonal prediction direction. If the Intra direction is close to the vertical mode 712 (i.e., group A), the Intra predictor weights 720 are used, which decrease row-wise downward. If the Intra direction is close to the horizontal mode 713 (i.e., group B), the Intra predictor weights 730 are used, which decrease column-wise toward the right direction. If the Intra direction is close to diagonal mode 714 (i.e., group C), the Intra predictor weights 740 are used, which decrease toward the lower-right diagonal direction. If the Intra mode is close to vertical-diagonal mode (VDIA) 715 (i.e., group D), the Intra predictor weights 750 are used, which decrease toward the lower-left diagonal direction. If the Intra mode is close to mode-2 716 (i.e., group E), the Intra predictor weights 760 are used, which decrease toward the upper-right diagonal direction. If the Intra mode is DC mode or planar mode, the w_Intra and w_Inter are set to 0.5 for the whole block. In another embodiment, the w_Intra and w_Inter can be other numbers. For example, the sum of w_Intra and w_Inter may have a value other than 1 while the sum of w_Intra and w_Inter is still equal to 1 if the Intra mode is DC mode or planar mode.

Figure 7:
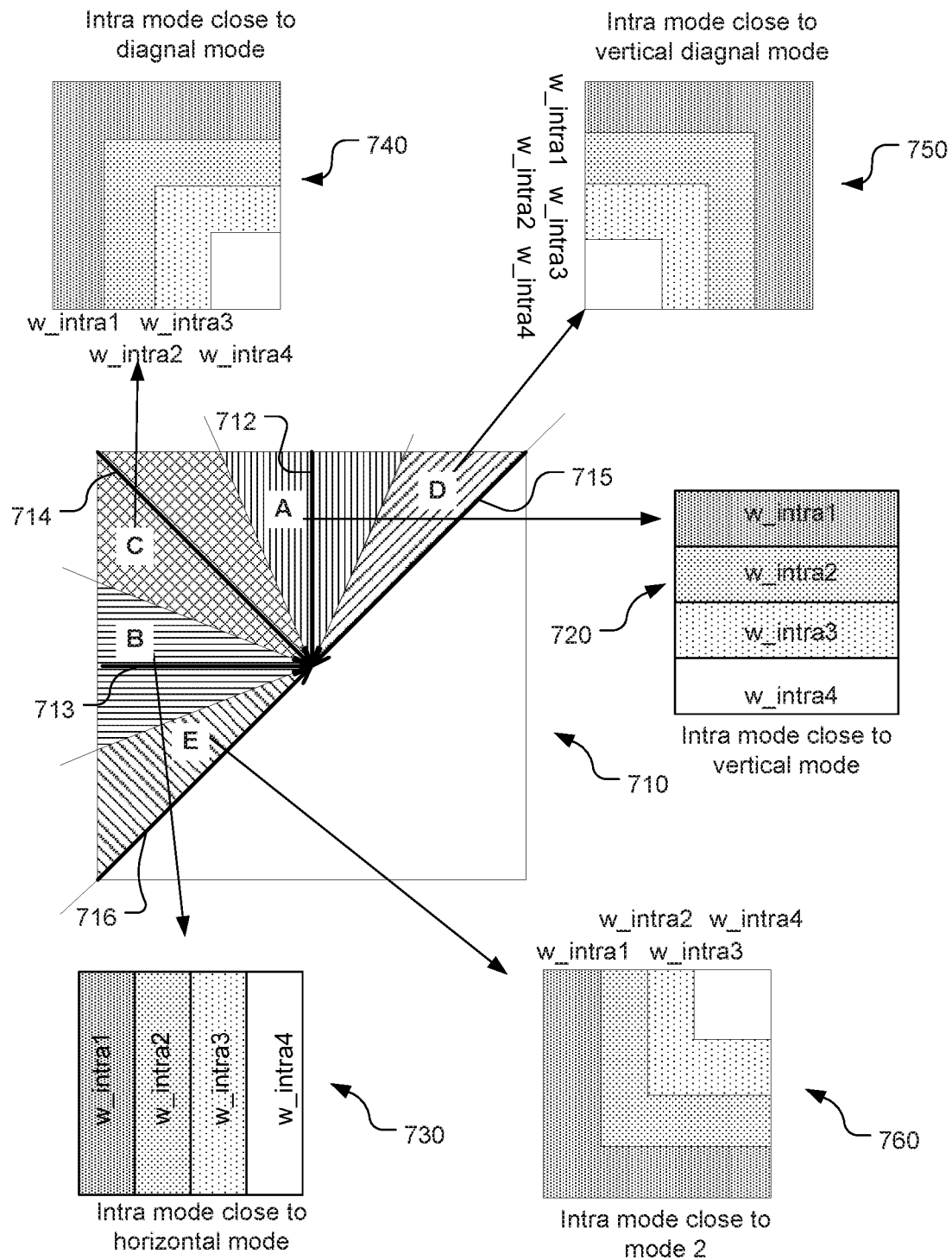
FIG. 7 illustrates an example another example of weighting coefficient selection according to the angular mode, where the Intra modes are grouped by their prediction directions into five groups and each group uses its own weight block.

In FIG. 7, the w_Intra1, w_Intra2, w_Intra_3, and w_Intra4 are the Intra predictor weighting coefficients for the sample bands. The Inter predictor weighting coefficients (i.e., w_Inter1, w_Inter2, w_Inter_3, and w_Inter4) can be derived according to: w_Inter1=1−w_Intra1, w_Inter2=1−w_Intra2, w_Inter3=1−w_Intra3, and w_Inter4=1−w_Intra4. In this example, there are 4 weighting coefficients, which are decreasing from the boundary near the reference pixels toward the boundary away from the reference pixels. In another embodiment, there can be N weighting coefficients for each block, where N is an integer greater than 1. In another embodiment, for a larger block size, a larger number of weighting coefficients may be used, and for the smaller block size, a smaller number of weighting coefficients may be used. In another embodiment, for each group, the region with the same coefficients can be nonlinear, which means the widths of each region are not necessarily the same.

In yet another embodiment, the weighting coefficient is related to the distance between current pixel and the reference pixels. When the Intra mode is an angular mode, if the current pixel is near the reference pixels, the Intra predictor has a larger weight than the Inter predictor. When the Intra mode is an angular mode, if the current pixel is far from the reference pixels, the Inter predictor has a larger weight than the Intra predictor. When the Intra mode is DC mode or planar mode, both w_Intra and w_Inter are set to 0.5 for the whole block. In yet another embodiment, the w_Intra and w_Inter can be other numbers. For example, the sum of w_Intra and w_Inter can have a value other than 1 while the sum of w_Intra and w_Inter is still equal to 1 if the Intra mode is DC mode or planar mode.

Figure 8:
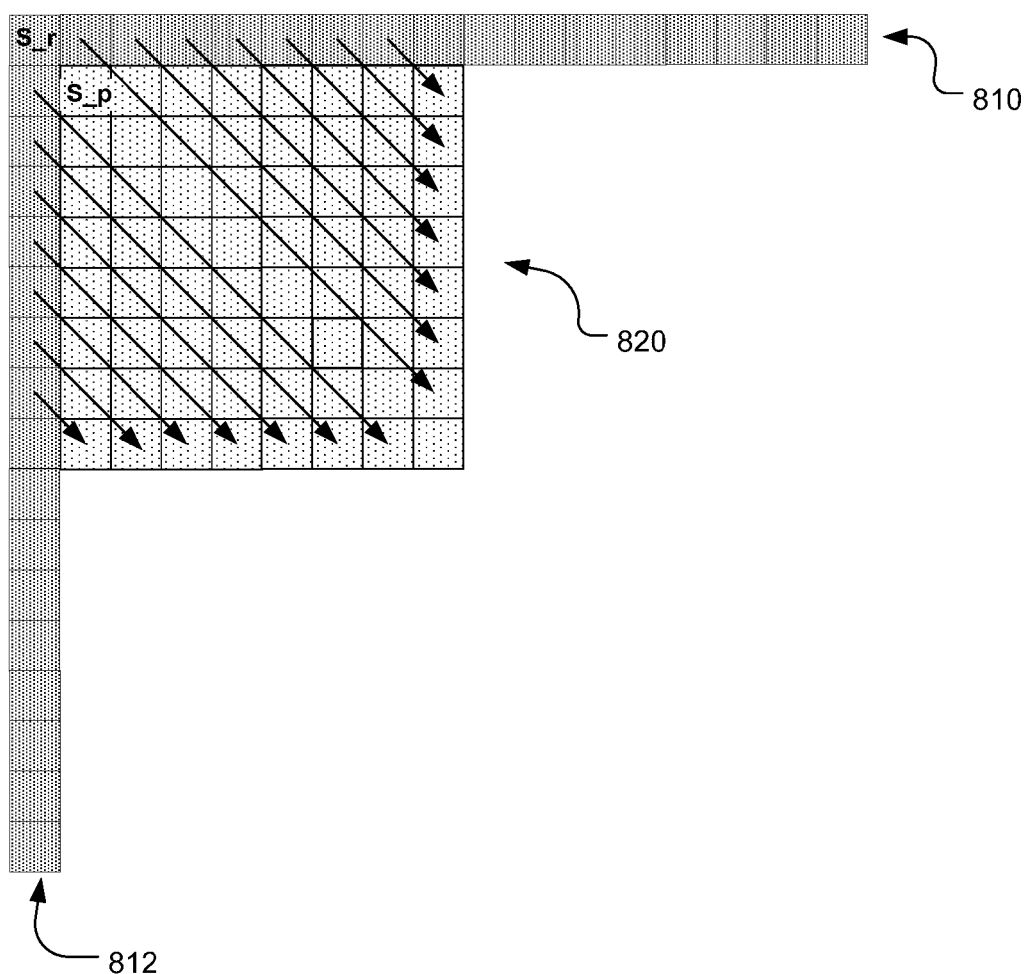
FIG. 8 illustrates an example of adjusting the weighting coefficients according to the distance between current samples and reference samples (810 and 812) when the Intra mode is the diagonal mode.

FIG. 8 illustrates an example of adjusting the weighting coefficients according to the distance between current samples (indicated by area 820) and reference samples (810 and 812) when the Intra mode is the diagonal mode. In FIG. 8, S_r corresponds to the reference sample, and S_p corresponds to the predicted sample. The distance between S_p and S_r is denoted by D. The Intra prediction weight, w_Intra can be represented as a function of D. For example, w_Intra can be calculated as follows:

$$w\_int ra(D) = a*D^2 + b \quad (3)$$

In the above equation, a and b are positive numbers. The values of a and b can be determined by training and can be signalled at Sequence Parameter Set (SPS), Picture Parameter Set (PPS), slice header or hard coded in the encoder side and decoder side. Also, w_intra should be larger when D is smaller. The closer the distance between reference samples and current samples, the larger the w_intra will be.

In another embodiment, the Intra prediction weight, w_Intra can be represented by other functions.

In one embodiment, a weighting parameter can be used to adjust w_Intra for each frame. This parameter can be signalled at SPS, PPS, or slice header. The new predictor will be calculated by the following equation:

$$Pred = w\_Intra * Adjustment\ Intra * Pred\_Intra + (1 - w\_Intra * Adjustment\ Intra) * Pred\_Inter \quad (4)$$

The parameter, Adjustment Intra in the above equation can be derived from a previous frame. Various ways to derive the Intra prediction weighting coefficient, w_Intra have been described previously, which can be applied to the above equation.

Edge Detection for Intra-Inter Mode.

According to this method, if approximated pattern edges can be detected, the weighting coefficients for the Intra and Inter predictors can be adaptively decided. In one embodiment, the Inter predictor can be used to detect pattern edges. Firstly, vertical and horizontal gradients of the Inter predictor are calculated (for example, the difference between the Inter predictors in the vertical direction can be used to derive the vertical gradient, and the difference between the Inter predictors in the horizontal direction can be used to derive the horizontal gradient), and then the two gradients are averaged for the next process. If the Intra prediction mode is close to the vertical mode, the sample with the largest value for each column is selected. For convenience, the pixel with the largest value for each column is referred as an edge pixel in this disclosure. For other samples in this column above this sample with largest value (i.e., the edge pixel), only the Intra predictor is used without blending process; and for those samples in this same column under this sample with the largest value (i.e., the edge pixel), only the Inter predictor is used for Intra-Inter prediction. Next, in order to reduce the discontinuity between samples processed using the Intra predictor or using the Inter predictor, the blending process is applied on those pixels around the boundary sample with the largest value (i.e., the edge pixel). For convenience, the edge pixels and the pixels around the edge pixels are referred as boundary region pixels. The area comprising the boundary region pixels is referred as a boundary region. If the Intra prediction mode is close to the horizontal mode, the sample with the largest value for each row is selected. For other samples on the left side of the sample with the largest value (i.e., an edge pixel) in this row, only the Intra predictor is used without blending process; and for those samples on the right side of the sample with the largest value in the same row, only the Inter predictor is used for Intra-Inter prediction, wherein above-mentioned other samples on the left side or the right side of the sample with the largest value (i.e., an edge pixel) in this row may be taken as target pixels in the current block not belonging to the boundary region. Next, to reduce the discontinuity between samples process using the Intra predictor or using the Inter predictor, the blending process is applied on those pixels around the boundary sample with the largest value. Again, for convenience, the edge pixels and the pixels around the edge pixels are referred as boundary region pixels. The area comprising the boundary region pixels is referred as a boundary region. In another embodiment, the Intra predictor can be used to detect pattern edges and process the same rules as previous embodiment to accomplish the partition. In another embodiment, the difference between Inter and Intra predictors can be used to detect pattern edges and also apply the same rule as previous embodiment to accomplish Intra-Inter prediction.

Figure 9:
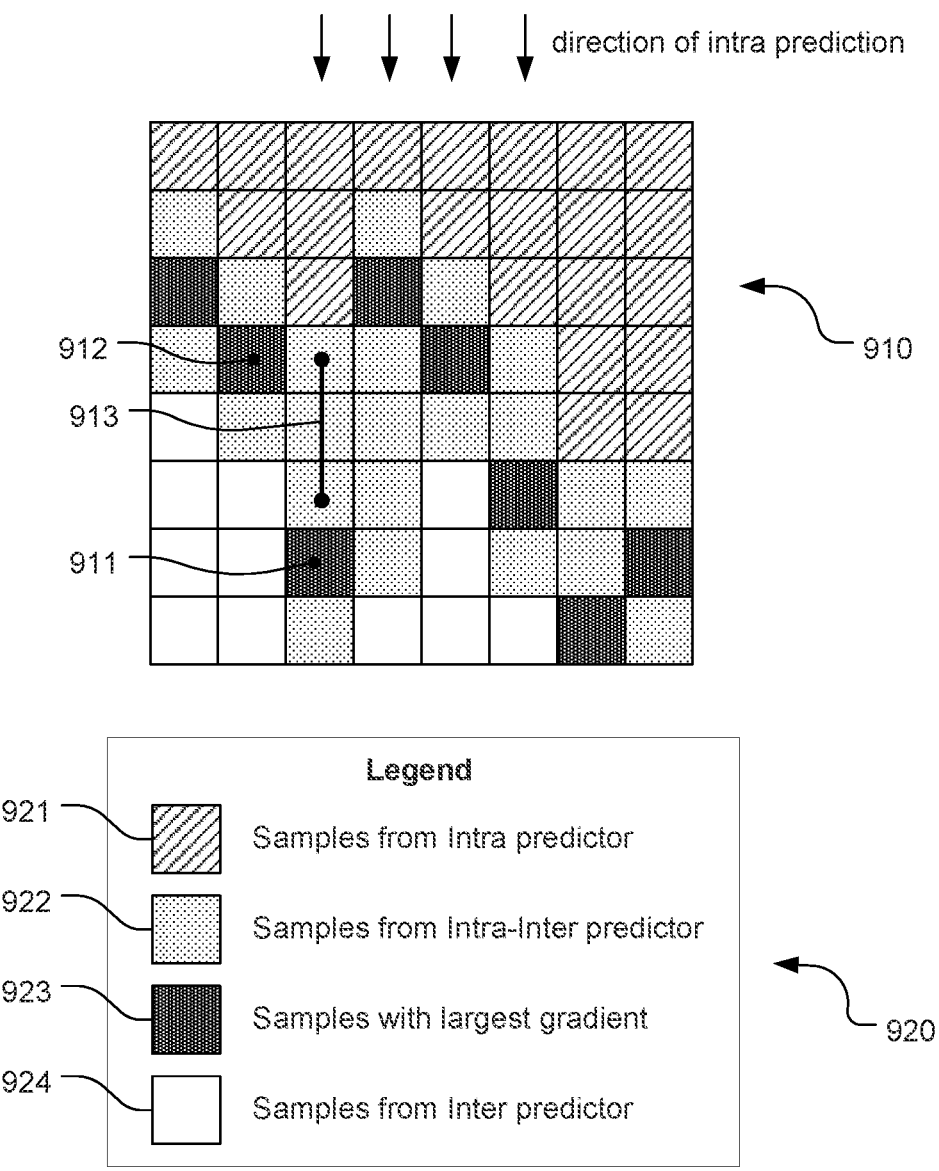
FIG. 9 illustrates an example of deriving the boundary region for Intra-Inter prediction according to one embodiment.

FIG. 9 illustrates an example of deriving the boundary region for Intra-Inter prediction according to the embodiment described above, where block 910 corresponds to the predictor for the current block and legend 920 indicates the predictor types. The example is illustrated for the case that the Intra prediction is close to the vertical prediction. Accordingly, a greatest gradient (as shown in darkest square 923 in FIG. 9) is determined for each column (i.e., from the left most column to the right most column). The pixels with the greatest gradient are also referred as edge pixels in this disclosure. In order to reduce the discontinuity between samples processed using the Intra predictor or using the Inter predictor, the blending process is applied on those pixels around the boundary sample with the largest value (i.e., the edge pixel). Accordingly, the Intra-Inter blending is also applied to a pixel above the edge pixel and a pixel below the edge pixel if the boundary pixels exist. The neighbouring pixels are indicated by light dot-filled square 922 in FIG. 9. Furthermore, the boundary region includes any additional pixel located in a current column between a current edge pixel in the current column (e.g. edge pixel 911) and a previous edge pixel (e.g. edge pixel 912) in a previous column. Therefore, three addition pixels indicated by line 913 are also included in the boundary region. As mentioned earlier, the neighbouring pixel immediately above edge pixel 911 is already included in the boundary region in the previous step. Now, all boundary region pixels (i.e., the light dot-filled pixels and the dark pixels) have been derived. Any pixel above the boundary region is designated for Intra prediction as indicated by slant-line filled square 921 and any pixel below the boundary region is designated for Inter prediction as indicated by white square 924.

The Operation for Weighting Normalization in Intra-Inter Mode.

As mentioned before, the weighting coefficients, w_Intra and w_Inter, may have a selected value for each sample band of the block. Blended Intra-Inter predictor is derived by combining the Intra predictor and the Inter predictor using a weighted sum. For calculating the blended Intra-Inter predictor, the division operations should be avoided since it will require more processing power to implement the division operation compared to the addition and multiplication operations. During calculating the blended Intra-Inter predictor, the division operation is used for weighting normalization. In order to avoid the division operation, in one embodiment of the present invention, the summation of w_Intra and w_Inter is scaled to a power-of-two value so that a shift operation can be used for the weighting normalization:

$$Pred = (w\_Intra * Pred\_Intra + w\_Inter * Pred\_Inter) >> (\text{Log } 2(w\_Intra + w\_Inter)) \quad (5)$$

In the above equation, notation ">>" means the right-shift operation and Log 2 means the log-base-2 operation. In another embodiment, a bias can be included to reduce the rounding error:

$$Pred = ((w\_Intra * Pred\_Intra + w\_Inter * Pred\_Inter) + bias) >> (\text{Log } 2(w\_Intra + w\_Inter)) \quad (6)$$

Smooth Filter for Intra Prediction of Intra-Inter Mode.

The Intra prediction in Intra-Inter mode is used to compensate some information loss due to Inter prediction. In Intra prediction, some smoothing filters and boundary filters are conditionally adopted to further improve the Intra predictor. For the Intra-Inter mode, the generation of Intra predictor can be the same as the normal Intra prediction. Alternatively, these smoothing filters or boundary filters can always be enabled or disabled in Intra prediction generation for the Intra-Inter mode.

Improvement for the First Row/Column of Intra-Inter Mode.

The information of neighbouring CUs can be referenced to increase the accuracy of current prediction. In one embodiment, samples belonging to current CU boundaries are generated by selecting the best one among the Intra predictor, the Inter predictor, and the blending results of Inter and Intra predictors. The best one can be defined as one predictor with the smallest difference compared to neighbouring samples, the smallest gradient between samples in the current CU in order to generate smooth boundaries, or the smallest gradients between samples in the current CU and samples in neighbouring CUs.

Reference Previous CU Parameter Setting for Intra-Inter Mode.

To reduce the computation complexity of Intra-Inter mode at the encoder, some information of Intra-Inter mode in the first RDO (Rate-Distortion Optimization) process can be saved and reused in the following RDO processes of different CU partitions. In one embodiment, the on/off decision of Intra-Inter mode is reused. After that, the predictor can follow the first decision to process or skip this mode. However, the prediction modes of neighbouring CUs may be different, so that the performance of Intra and Inter predictions in the Intra-Inter mode may be changed. Therefore, in another embodiment, disabling Intra-Inter mode will be always tested even if the first decision is enabled. In another embodiment, the best Intra prediction mode of Intra-Inter mode can also be reused to reduce the complexity.

Blending with Boundary for Intra-Inter Mode.

In the Intra-Inter mode, the Intra prediction is used to compensate the shortcoming of Inter prediction. However, for a large size CU, the predicted samples far from reference samples tend to be inaccurate in the Intra prediction. To overcome this problem, the boundary constraint for Intra-Inter blending is proposed. In one embodiment, only several first rows or columns close to reference samples will go through Intra-Inter blending process; and other samples are derived directly from the Inter prediction. If the Intra prediction mode is close to the vertical mode, the Intra predictor weights decrease row-wise within the first N rows that are close to reference samples. If the Intra prediction mode is close to the horizontal mode, the Intra predictor weights decrease column-wise within the first N columns that are close to reference samples (i.e., Intra predictor weights decrease from $1^{st}$ column to Nth column, and Intra predictor weights of the remaining columns (if any) are set to 0). For DC mode or Planar Intra mode, the w_Intra and w_Inter equal to 0.5 are applied only within the L-shaped (the first N rows and N columns close to the reference samples) area. In another embodiment, the gradients for samples in the first row and column are calculated first. If the largest gradient in the first row/column is much larger than the average gradient calculated over this row/column, then the position of the largest gradient is a boundary in the blending process; otherwise, a default range boundary is used. With this blending boundary, the Intra prediction in Intra-Inter mode can be simplified by only generating the first N rows or N columns for further blending. In some embodiments, N is pre-defined or signalled based on size of the current block. In another embodiment, the differences between the Inter/Intra predictor and neighbouring reconstructed pixels in the L-shape of top and left CUs are calculated and the positions with the largest differences are detected. The blending boundary can be set using any of the boundary derivation methods disclosed above or a default boundary can be used for this constrain.

The CU Size Constrains for Intra-Inter Mode.

For small CUs, each syntax element requires more side information overhead compared to larger CUs. Therefore, removing one flag for small CUs may achieve a good trade-off point in terms of coding efficiency. In one embodiment, Intra-Inter mode is forced to be off for small CUs. In another embodiment, due to the low probability of Intra-Inter mode being selected in large CUs, Intra-Inter mode for large CUs is forced to be off.

Deriving Intra Prediction Mode by Analysing Intra-Inter Correlation in Intra-Inter Mode.

With both the Intra and Inter predictors used in Intra-Inter mode, some useful information can be generated by comparing their correlation. In one embodiment, instead of signalling the Intra prediction mode used in the Intra-Inter mode, comparing Intra-Inter blending results with the current CU at the encoder, the comparison between Intra and Inter predictors can be used to select the Intra prediction mode used in the Intra-Inter mode at the decoder. In this case, signalling the Intra prediction mode used in the Intra-Inter mode can be eliminated.

Figure 10:
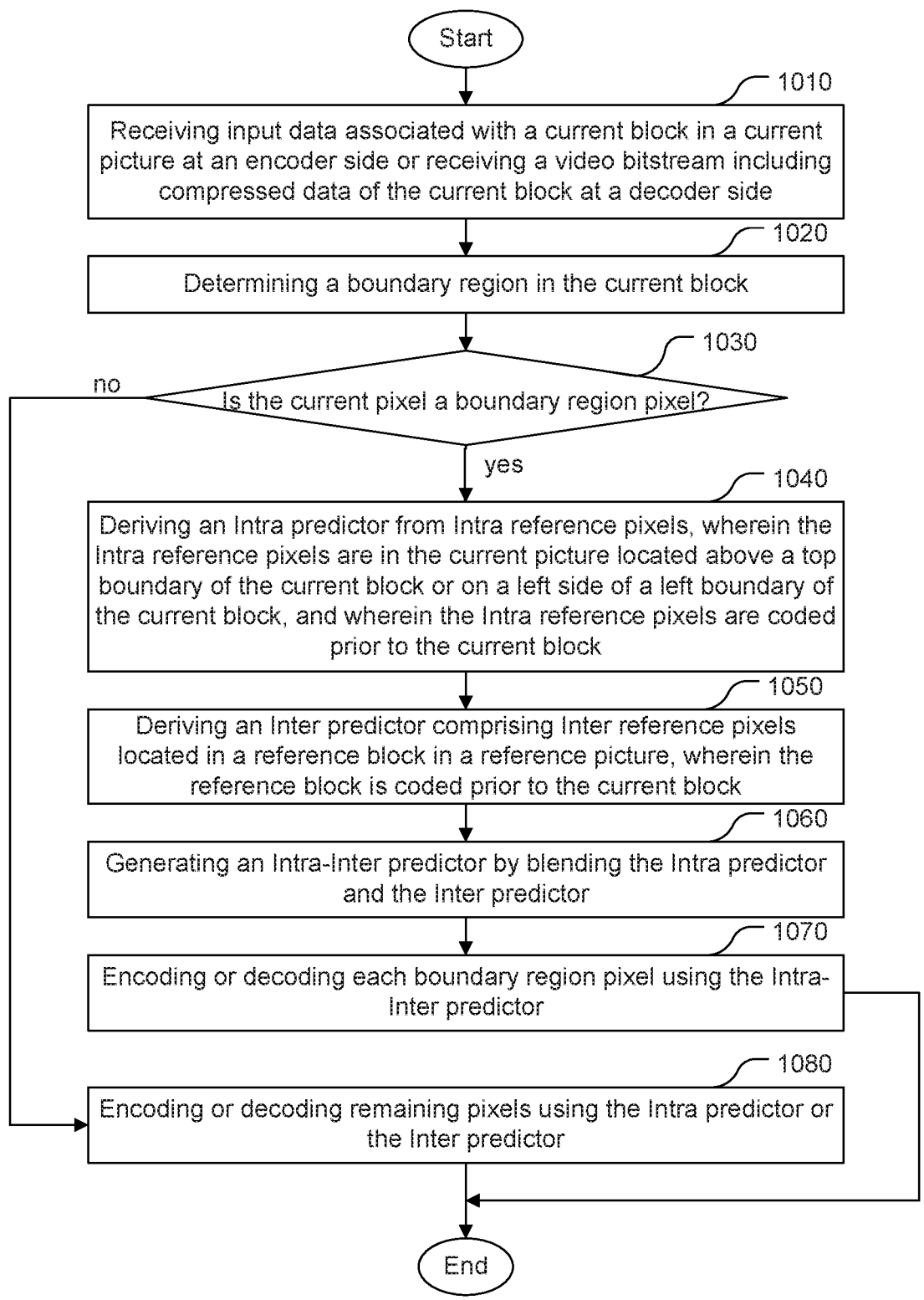
FIG. 10 illustrates an exemplary flowchart of a video coding system using Intra-Inter prediction according to an embodiment of the present invention, where the Intra-Inter prediction is only applied to a boundary region.

FIG. 10 illustrates an exemplary flowchart of a video coding system using Intra-Inter prediction according to an embodiment of the present invention. The steps shown in the flowchart may be implemented as program codes executable on one or more processors (e.g., one or more CPUs) at the encoder side. The steps shown in the flowchart may also be implemented based on hardware such as one or more electronic devices or processors arranged to perform the steps in the flowchart. According to this method, input data associated with a current block in a current picture is received at an encoder side or a video bitstream including compressed data of the current block is received at a decoder side in step 1010. A boundary region in the current block is determined in step 1020. Whether a current pixel is a boundary pixel is check in step 1030. When the current pixel is a boundary pixel (i.e., the "yes" path from step 1030), steps 1040 to 1070 are performed. Otherwise (i.e., the "no" path from step 1030), step 1080 is performed. In step 1040, an Intra predictor is derived from Intra reference pixels, where the Intra reference pixels are in the current picture located above a top boundary of the current block or on a left side of a left boundary of the current block, and the Intra reference pixels are coded prior to the current block. In step 1050, an Inter predictor comprising Inter reference pixels located in a reference block in a reference picture is derived, where the reference block is coded prior to the current block. In step 1060, an Intra-Inter predictor is generated by blending the Intra predictor and the Inter predictor. In step 1070, each boundary region pixel is encoded at the encoder side or decoded at the decoder side using the Intra-Inter predictor. In step 1080, the remaining pixels are encoded at the encoder side or decoded at the decoder side using the Inter predictor or the Intra predictor.

Figure 11:
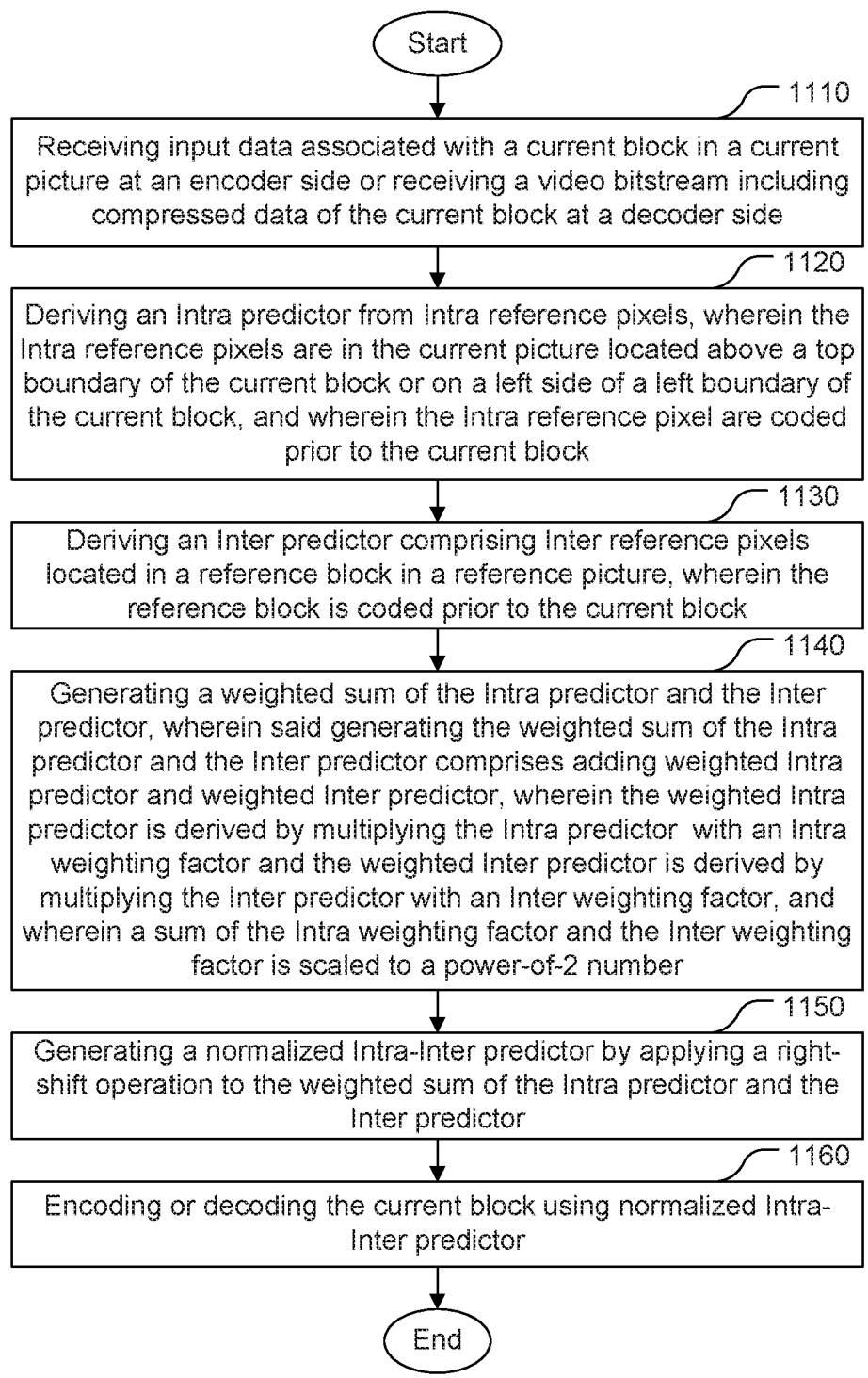
FIG. 11 illustrates another exemplary flowchart of a video coding system using Intra-Inter prediction according to an embodiment of the present invention, where the sum of the Intra weighting factor and the Inter weighting factor is scaled to a power-of-2 number to avoid the need for the division operation.

FIG. 11 illustrates another exemplary flowchart of a video coding system using Intra-Inter prediction according to an embodiment of the present invention. According to this method, input data associated with a current block in a current picture is received at an encoder side or a video bitstream including compressed data of the current block is received at a decoder side in step 1110. An Intra predictor is derived from Intra reference pixels in step 1120, where the Intra reference pixels are in the current picture located above a top boundary of the current block or on a left side of a left boundary of the current block, and the Intra reference pixels are coded prior to the current block. An Inter predictor comprising Inter reference pixels located in a reference block in a reference picture is derived in step 1130, where the reference block is coded prior to the current block. A weighted sum of the Intra predictor and the Inter predictor is generated in step 1140, where said generating the weighted sum of the Intra predictor and the Inter predictor comprises adding weighted Intra predictor and weighted Inter predictor, wherein the weighted Intra predictor is derived by multiplying the Intra predictor with an Intra weighting factor and the weighted Inter predictor is derived by multiplying the Inter predictor with an Inter weighting factor, and a sum of the Intra weighting factor and the Inter weighting factor is scaled to a power-of-2 number. A normalized Intra-Inter predictor is generated by applying a right-shift operation to the weighted sum of the Intra predictor and the Inter predictor in step 1150. The current block is encoded at the encoder side or decoded at the decoder side using the normalized Intra-Inter predictor in step 1160.

Figure 12:
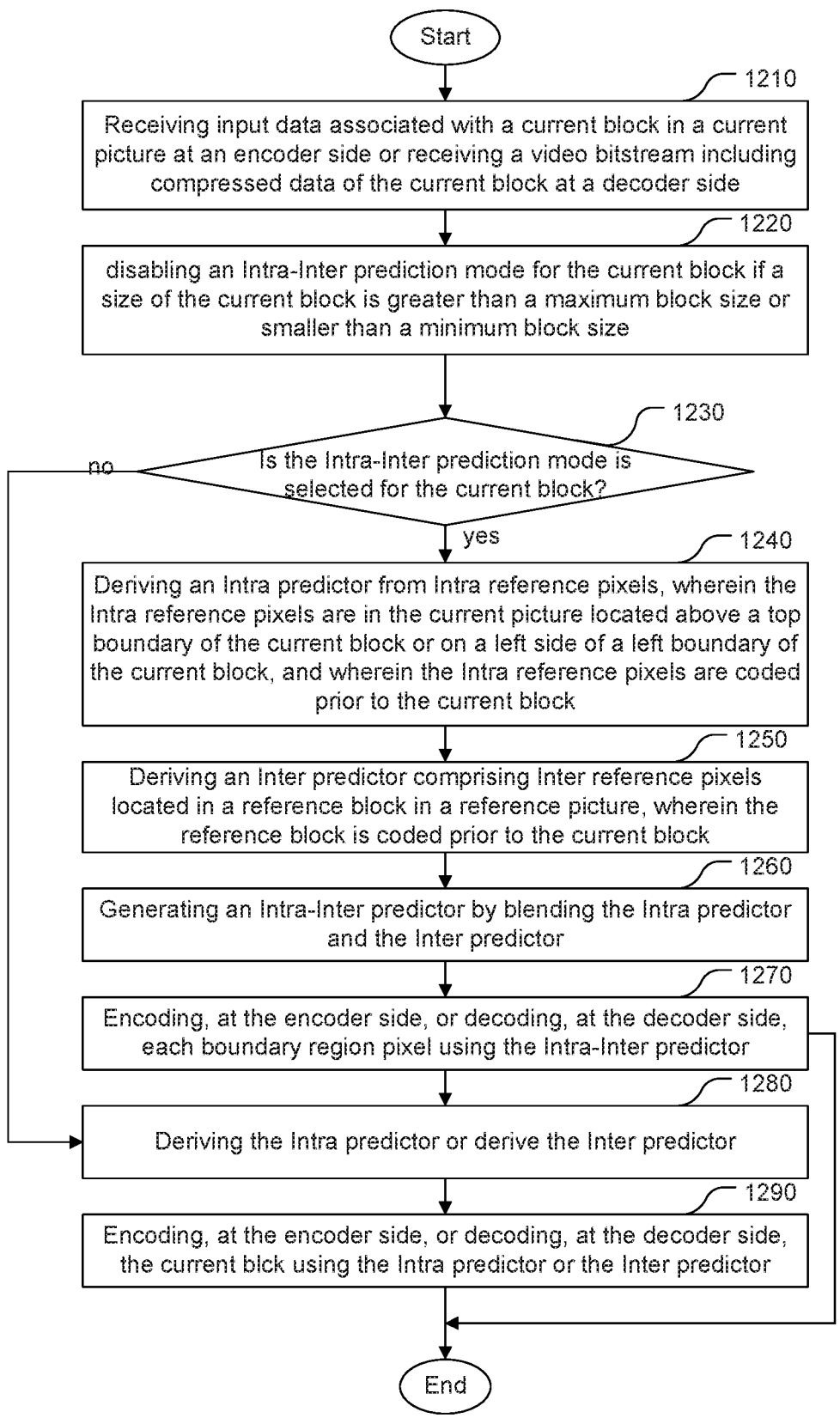
FIG. 12 illustrates yet another exemplary flowchart of a video coding system using Intra-Inter prediction according to an embodiment of the present invention, where the Intra-Inter prediction is applied depending on the current block size.

FIG. 12 illustrates an exemplary flowchart of a video coding system using Intra-Inter prediction according to an embodiment of the present invention. According to this method, input data associated with a current block in a current picture is received at an encoder side or a video bitstream including compressed data of the current block is received at a decoder side in step 1210. The Intra-Inter prediction mode is disabled for the current block if the size of the current block is greater than a maximum block size or smaller than a minimum block size in step 1220. Whether the Intra-Inter prediction mode is selected for the current block is checked in step 1230. When the Intra-Inter prediction mode is selected for the current block (i.e., the "yes" path from step 1230), steps 1240 to 1270 are performed. Otherwise (i.e., the "no" path from step 1230), steps 1280 and 1290 are performed. In step 1240, an Intra predictor is derived from Intra reference pixels, where the Intra reference pixels are in the current picture located above a top boundary of the current block or on a left side of a left boundary of the current block, and the Intra reference pixels are coded prior to the current block. In step 1250, an Inter predictor comprising Inter reference pixels located in a reference block in a reference picture is derived, where the reference block is coded prior to the current block. In step 1260, an Intra-Inter predictor is generated by blending the Intra predictor and the Inter predictor. In step 1270, the current block is encoded at the encoder side or decoded at the decoder side using the Intra-Inter predictor. In step 1280, the Intra predictor or the Inter predictor is derived. In step 1290, the current block is encoded at the encoder side or decoded at the decoder side using the Inter predictor or the Intra predictor.

Any of the foregoing proposed methods can be implemented in encoders and/or decoders. As is known in the field of video coding, the Intra predictor and the Inter predictor can be derived at the encoder side as well the decoder side. The Intra-Inter predictor can be generated by blending the Intra predictor and the Inter predictor using weighting coefficients. The weighting coefficients can be derived or signalled. Therefore, both the encoder and the decoder can perform the same blending process.

The flowcharts shown above are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding performed by a video encoder or a video decoder, the method comprising:
   receiving input data associated with a current block in a current picture at an encoder side or receiving a video bitstream including compressed data of the current block at a decoder side:
   deriving an Intra predictor from Infra reference pixels, the Intra reference pixels being in the current picture located above a top boundary of the current block or on a left side of a left boundary of the current block, and the Intra reference pixels being coded prior to the current block;
   deriving an Inter predictor comprising Inter reference pixels located in a reference block in a reference picture, the reference block being coded prior to the current block:
   generating a weighted sum of the Intra predictor and the Inter predictor, comprising:
   multiplying the Intra predictor with an Intra weighting factor to obtain a weighted Intra predictor:

multiplying the Triter predictor with an Inter weighting factor to obtain a weighted Inter predictor; and adding the weighted Intra predictor and the weighted Inter predictor, wherein a sum of the Intra weighting factor and the Inter weighting factor is a power-of-2 number;

generating a normalized Intra-Inter predictor by applying a right-shift operation by a number of bit or bits to the weighted sum of the Intra predictor and the Inter predictor. the number being log-base-2 of the sum of the Intra weighting factor and the Inter weighting factor: and encoding or decoding the current block using the normalized Intra-Inter predictor.

2. The method of claim 1, wherein the generating a-the weighted sum of the Intra predictor and the Inter predictor further comprises adding a bias to a result of the adding the weighted Intra predictor and the weighted Inter predictor.

3. An apparatus of video coding in a video coding system, the apparatus comprising one or more electronic devices or processors configured to:

receive input data associated with a current block in a current picture at an encoder side or receiving a video bitstream including compressed data of the current block at a decoder side;

derive an Intra predictor from Infra. reference pixels, wherein the Intra reference pixels being in the current picture located above a top boundary of the current block or on a left side of a left boundary of the current block, and the Intra reference pixel being coded prior to the current block;

derive an Inter predictor comprising Inter reference pixels located in a reference block in a reference picture, the reference block being coded prior to the current block:

generate a weighted sum of the Intra predictor and the Inter predictor by performing:

multiplying the Intra predictor with an Intra weighting factor to obtain a weighted Intra predictor:

multiplying the Inter predictor with an Inter weighting factor to obtain a weighted Inter predictor; and adding the weighted Intra predictor and the weighted Inter predictor, wherein a sum of the Intra weighting factor and the Inter weighting factor is scaled to a power-of-2 number;

generate a normalized Intra-Inter predictor by applying a right-shift operation by a number of bit or bits to the weighted sum of the Intra predictor and the Inter predictor, the number being log-base-2 of the sum of the Intra weighting factor and the Inter weighting factor; and encode or decode the current block using the normalized Intra-Inter predictor.

4. A method of video coding performed by a video encoder or a video decoder, the method comprising:

receiving input data associated with a current block in a current picture at an encoder side or receiving a video bitstream including compressed data of the current block at a decoder side;

disabling an Intra-Inter prediction mode for the current block if a size of the current block meets one of conditions including (i) being greater than a maximum block size and (ii) being smaller than a minimum block size;

in a case that the Intra-Inter prediction mode is not disabled, determining whether the Intra-Inter prediction mode is selected for the current block;

when the Intra-Inter prediction mode is determined as selected for the current block:

deriving an Intra predictor from Infra reference pixels, the Intra reference pixels being in the current picture located above a top boundary of the current block or on a left side of a left boundary of the current block, and the Intra reference pixel being coded prior to the current block;

deriving an Inter predictor comprising Inter reference pixels located in a reference block in a reference picture, the reference block being coded prior to the current block:

generating an Intra-Inter predictor by blending the Intra predictor and the Inter predictor; and encoding or decoding the current block using the Intra-Inter predictor; and when the Intra-Inter prediction mode is determined as disabled or not selected for the current block:

deriving either the Intra predictor or the Inter predictor; and encoding or decoding the current block using the derived Intra predictor or the derived Inter predictor.

5. An apparatus of video coding in a video coding system, the apparatus comprising one or more electronic devices or processors configured to:

receive input data associated with a current block in a current picture at an encoder side or receiving a video bitstream including compressed data of the current block at a decoder side;

disable an Intra-Inter prediction mode for the current block if a size of the current block meets one of conditions including (i) being greater than a maximum block size and (ii) being smaller than a minimum block size;

in a case that the Intra-Inter prediction mode is not disabled, determine whether the Intra-Inter prediction mode is selected for the current block:

when the Intra-Inter prediction mode is determined as selected for the current block:

derive an Intra predictor from Intra reference pixels, the Intra reference pixels being in the current picture located above a top boundary of the current block or on a left side of a left boundary of the current block, and the Intra reference pixel being coded prior to the current block;

derive an Inter predictor comprising Inter reference pixels located in a reference block in a reference picture, the reference block being coded prior to the current block;

generate an Intra-Inter predictor by blending the Intra predictor and the Inter predictor; and encode or decode the current block using the Intra-Inter predictor; and when the Intra-Inter prediction mode is determined as disabled or not selected for the current block:

derive either the Intra predictor or the Inter predictor; and encode or decode the current block using the derived Intra predictor or the derived Inter predictor.

6. The method of claim 4, wherein whether the Intra-Inter prediction mode is selected for the current block is specified by a block level flag.

* * * * *

UNITED STATES PATENT AND TRADEMARK OFFICE
CERTIFICATE OF CORRECTION

PATENT NO. : 11,070,815 B2
APPLICATION NO. : 16/619244
DATED : July 20, 2021
INVENTOR(S) : Chen-Yen Lai et al.

Page 1 of 1

It is certified that error appears in the above-identified patent and that said Letters Patent is hereby corrected as shown below:

In the Claims

In Column 16, Claim 1, Line 53, "side:" should read -- side; --.

In Column 16, Claim 1, Line 54, "Infra" should read -- Intra --.

In Column 16, Claim 1, Line 63, "block:" should read -- block; --.

In Column 16, Claim 1, Line 67, "predictor:" should read -- predictor; --.

In Column 17, Claim 1, Line 1, "Triter" should read -- Inter --.

In Column 17, Claim 1, Line 12, "factor:" should read -- factor; --.

In Column 17, Claim 2, Line 15, "a-the" should read -- the --.

In Column 17, Claim 3, Line 35, "block:" should read -- block; --.

In Column 17, Claim 3, Line 45, "Inter weighting factor is scaled to a power-of-2" should read -- Inter weighting factor is a power-of-2 --.

In Column 18, Claim 4, Line 15, "block:" should read -- block; --.

Signed and Sealed this
Twenty-sixth Day of April, 2022

Katherine Kelly Vidal
*Director of the United States Patent and Trademark Office*